(No Model.)
W. B. ELTONHEAD.
MATCH.
No. 302,717. Patented July 29, 1884.
WITNESSES:
Harry L. Ashenfelter.
John E. Barker.
INVENTOR:
William B. Eltonhead
by his attorneys
Howson & Sons

United States Patent Office.

WILLIAM B. ELTONHEAD, OF PHILADELPHIA, PENNSYLVANIA, ASSIGNOR TO WILLIAM FYSON, OF CHICAGO, ILLINOIS.

MATCH.

SPECIFICATION forming part of Letters Patent No. 302,717, dated July 29, 1884.

Application filed June 6, 1883. (No model.)

*To all whom it may concern:*

Be it known that I, WILLIAM B. ELTONHEAD, a citizen of the United States, and a resident of Philadelphia, Pennsylvania, have invented certain Improvements in Matches or Fusees, of which the following is a specification.

My invention relates to an improvement in matches or fusees such as are tipped with a composition which will burn slowly but without flame, the object of my invention being to cheaply manufacture such fusees, and to provide them with a composition which cannot be extinguished by wind or rain, and which will retain heat for a long time.

In the accompanying drawing is shown an enlarged view of a match or fusee made according to my invention, A being the stick, B the head, made of my improved composition, and D the tip, of ordinary friction-match compound.

In making the composition for the head B, I take a base or binding composition—such as glue or starch mixed with water—and to this add, preferably, chlorate of potash, saltpeter, amorphous phosphorus, cascarilla-bark, and charcoal, in such proportions as to produce a compound which will burn without flame.

In order to prevent too rapid a combustion, and to insure the retention of heat in the compound after ignition, I add to the compound, in the proportion of about one-fourth of the whole, a powder made by grinding up discarded crucibles, cupels, or scorifiers, such as are used by jewelers and assayers, this powder being such that it will be heated to a high degree, and will retain this heat for a long time, the crucibles being so impregnated with metals or other substances taken up during the use of the crucibles that the powder produced by grinding up said crucibles is especially adapted to furnish an acceptable ingredient for the match compound.

Jewelers' or assayers' cupels—such as I propose to use when they are discarded after use—contain clay, bone-dust, silicate, potash, and infinitesimal portions of metal—such as silver, copper, and lead—the metal in the crucible depending upon the use of the same.

As the stick A of the match is not intended to be burned, I make the same of paper or wood pulp, which may be produced from shavings, sawdust, or other waste wood, and may be combined with any adhesive material, the pulp being made in sheets, which can be passed between grooved rollers to separate it into strips of the proper size, to be afterward cut into lengths for the matches.

To strengthen the stick and insure the firm hold of the composition thereon, I provide said stick with an outer covering or braid, a, of wire.

The composition may be scented with the waste or refuse from perfumery-works, and the sticks may be colored, if desired, with the waste from dye-houses, and as these materials, as well as the waste crucibles, are at present worthless, their use in the manner which I have proposed will not add to the expense of the matches or fusees.

The stick of the match and the mode of making the same form no part of my present invention, but will probably form the subject of a separate application for patent.

I claim as my invention—

A match or fusee having a head, B, consisting of an ignitible compound, combined with a powder made by grinding crucibles, cupels, &c., after use, as set forth.

In testimony whereof I have signed my name to this specification in the presence of two subscribing witnesses.

WM. B. ELTONHEAD.

Witnesses.
 JOHN E. PARKER,
 HARRY SMITH.